United States Patent [19]

Nakano et al.

[11] Patent Number: 4,703,839
[45] Date of Patent: Nov. 3, 1987

[54] BRAKE DEVICE FOR MOTOR VEHICLES

[75] Inventors: Yasuo Nakano, Saitama; Kazuaki Fukami; Yukimasa Nishimoto, both of Tokyo, all of Japan

[73] Assignee: Honda Giken Kogyo Kabushiki Kaisha, Tokyo, Japan

[21] Appl. No.: 902,067

[22] Filed: Aug. 27, 1986

Related U.S. Application Data

[63] Continuation of Ser. No. 561,214, Dec. 13, 1983, abandoned.

[30] Foreign Application Priority Data

Dec. 14, 1982 [JP]   Japan ............................ 57-189494[U]

[51] Int. Cl.$^4$ ....................... B60T 11/00; B60T 13/00; B62L 1/06
[52] U.S. Cl. ................................. 188/346; 188/24.14; 188/344; 303/6 R
[58] Field of Search ............... 188/344, 346, 141, 361, 188/106 P, 369, 140 A, 72.1, 70 B, 72.9, 140 R, 24.14, 72.2, 73.41; 180/219; 303/6 R, 6 A

[56] References Cited

U.S. PATENT DOCUMENTS

| 1,826,824 | 10/1931 | Reynolds | 188/346 |
| 2,419,113 | 4/1947 | Bricker | 188/141 X |
| 2,596,556 | 5/1952 | Holleritm | 188/141 X |
| 3,277,982 | 10/1966 | Kimberlin | 188/346 |
| 3,283,860 | 11/1966 | Watanabe | 188/346 |
| 3,700,075 | 10/1972 | Mortimer et al. | 188/346 |
| 3,935,927 | 2/1976 | Haraikawa | 188/344 X |
| 4,239,294 | 12/1980 | Burgdorf | 188/344 X |

FOREIGN PATENT DOCUMENTS

| 1151541 | 1/1958 | France | 188/140 A |
| 1444788 | 5/1965 | France | 188/346 |
| 56-95781 | 8/1981 | Japan | |
| 1517168 | 7/1978 | United Kingdom | 188/344 |

Primary Examiner—Andres Kashnikow
Assistant Examiner—Robert J. Oberleitner
Attorney, Agent, or Firm—Lyon & Lyon

[57] ABSTRACT

A disk brake system employing a caliper support bracket pivotally mounted about the axis of a first disk which is coupled with a hydraulic cylinder. The hydraulic cylinder in turn drives a second caliper assembly on a second disk. The hydraulic cylinder driven by the caliper support bracket is aligned with the plane of the disk. A bell crank may be employed in alignment with the disk to couple the caliper support bracket and the hydraulic cylinder together.

5 Claims, 3 Drawing Figures

BRAKE DEVICE FOR MOTOR VEHICLES

This application is a continuation of application Ser. No. 561,214, filed Dec. 13, 1983, now abandoned.

BACKGROUND OF THE INVENTION

The field of the present invention is disk brake systems for vehicles and particularly systems having two disks acting in series.

Brake devices have been developed having particular applicability to disk brake systems which operate in series. That is, the brake actuation mechanism controls a first set of calipers. The first calipers are mounted such that they may move with the disk. However, the calipers are constrained by a hydraulic cylinder coupled with the caliper support bracket. As braking force is applied to the rotating disk, the calipers are forced to move with the disk. This movement is restricted by the hydraulic cylinder coupled with the caliper support bracket. A resulting pressure is created within the hydraulic cylinder. This pressure may be employed to actuate a second caliper on another disk. In this way, actuation through a single mechanism achieves braking force on two disks.

The foregoing system has found utility with dual disk systems on the front wheel of a motorcycle. Such a system is illustrated in Japanese Patent No. 56-95781 issued in 1981. The advantage of such a system is that certain of the work performed by the first disk in braking against the calipers is transferred to the second caliper and disk. With a single master cylinder or separate master cylinders operating in parallel, increased work by the operator or increased brake size and complexity is required to increase braking capacity. By employing the force of braking, these disadvantages are overcome while increased braking capacity is made available.

A difficulty which has been experienced with such systems is the need for substantial components and mechanisms to withstand the forces applied by the first disk and caliper in actuating the driven hydraulic cylinder. Specifically, greater strength is required in the caliper support bracket and the piston of the hydraulic cylinder in order to withstand the imposed forces and torques. Naturally, unsprung weight on a motorcycle front suspension is disadvantageous. Substantial structural requirements on the brake system components can add unwanted unsprung weight to such a system.

SUMMARY OF THE INVENTION

The present invention is directed to a series type braking system employing a first caliper and disk arrangement where the caliper is mounted on a movable bracket with the reaction force of braking being imposed upon a hydraulic cylinder. The output of the hydraulic cylinder may be employed to actuate a second caliper and disk arrangement. In a first aspect of the present system, the hydraulic cylinder is located in the plane of the first disk. The disk is thus mounted conveniently on the hub assembly of the front suspension such that the cylinder can be accommodated in such planar alignment. As a result, stresses imposed upon the caliper support bracket, its mount, and the hydraulic cylinder itself may be minimized.

In a further aspect of the present invention, the coupling between the movable caliper support bracket and the hydraulic cylinder may include a bell crank. A bell crank provides additional advantage in the difficult circumstance of locating the hydraulic cylinder. Through the use of a bell crank, greater freedom is allowed in locating the physical position of the hydraulic cylinder relative to the caliper support bracket. Additionally, variations in mechanical advantage and relative displacement may be selected. For example, a smaller actual displacement may be desired for the caliper support bracket than is desirable for the piston stroke of the hydraulic cylinder. Under such circumstances, a bell crank having a short arm extending to the caliper support bracket and a longer arm extending to the piston of the hydraulic cylinder would accomplish this result.

Accordingly, it is an object of the present invention to provide an improved series type disk brake system minimizing structural requirements and maximizing flexibility of design. Other and further objects and advantages will appear hereinafter.

DETAILED DESCRIPTION OF THE PREFERRED EMBODIMENT

Figure 1:
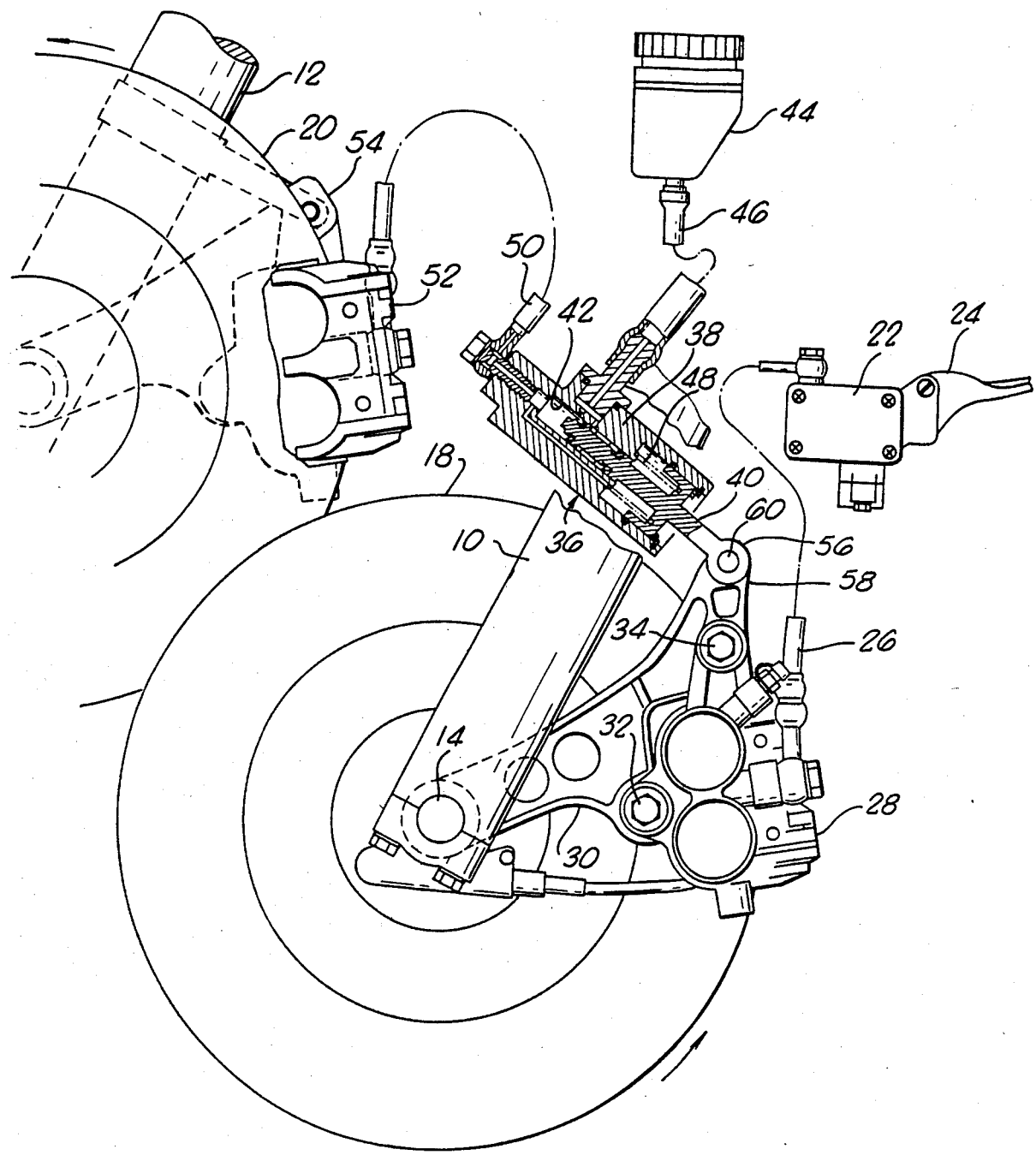
FIG. 1 is a side view of a first embodiment of the present invention.
Figure 2:
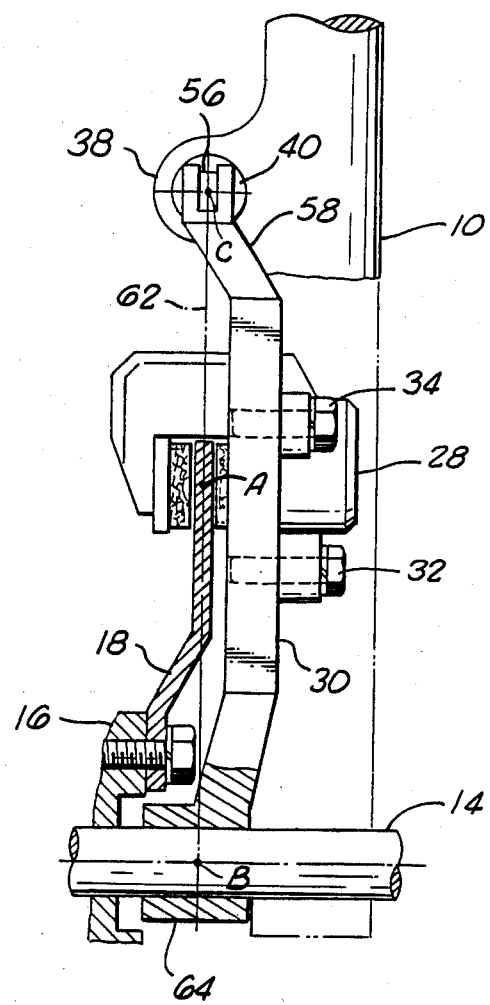
FIG. 2 is an edge view of the caliper support bracket of FIG. 1.

Turning in detail to the drawings, and particularly the embodiment of FIGS. 1 and 2, a portion of a front fork of a motorcycle front suspension is illustrated as including left and right extensions 10 and 12, respectively. The extensions 10 and 12 receive a support shaft or axle 14 defining a first axis relative to the vehicle transverse to the suspension at the bottom of the front fork. No wheel is illustrated and only a portion of a conventional hub 16 is shown in FIG. 2 as being mounted about the support shaft 14. Outwardly of the hub 16 on either side thereof and fixed to rotate therewith about the support shaft 14 are two disks 18 and 20. The disks naturally rotate with the wheel and hub and define the surfaces employed for braking.

A master cylinder 22 controlled by a brake lever 24 directs fluid pressure through a hydraulic line 26 to a first caliper assembly 28. The actuation of the brake lever 24, master cylinder 22 and first caliper assembly 28 may be of conventional design. Actuation of the brake lever 24 thus results in the first caliper assembly 28 forcibly gripping the first disk 18 for braking action.

The first caliper assembly 28 is mounted on a first caliper assembly support bracket 30 by fasteners 32 and 34. The caliper support bracket 30 is in turn mounted on the support shaft 14 such that it may pivot about the axis of the support shaft 14. Naturally, clamping force by the first caliper assembly 28 results in a force reaction to the braking force tending to move the first caliper support bracket 30 and the first caliper assembly 28 in the direction of rotation of the first disk 18 as indicated by the arrow in FIG. 1.

Mounted to the vehicle and particularly to the left extension 10 is a hydraulic cylinder, generally designated 36. The hydraulic cylinder 36 includes a cylinder body 38 and a piston 40. A fluid chamber 42 defined by the cylinder 38 and piston 40 is in communication with a hydraulic fluid reservoir 44 through supply line 46. A spring 48 biases the piston 40 outwardly of the cylinder body 38.

The chamber 42 is in communication with a hydraulic line 50 which directs hydraulic pressure upon actuation of the hydraulic cylinder 36 to a second caliper assembly 52. The second caliper assembly 52 may also be conventional in design. This second caliper assembly 52 is associated with the second disk 20 and is fixed relative to the vehicle by a bracket 54. The second caliper support bracket 54 is generally fixed to the right extension 12 of the front fork. As a result, actuation of the piston 40 to reduce the cavity 42 results in braking action of the second caliper assembly 52 on the disk 20.

The piston extends outwardly from the hydraulic cylinder 36 to an eye 56 meeting with an extension 58 of the first caliper support bracket 30. The eye 56 and extension 58 are pinned together by a pin 60 extending therebetween. In this way, motion of the first caliper support bracket 30 may be transferred to the piston 40 for pressurization of the cavity 42. Braking of the first disk 18 by the first caliper assembly 28 results in rotation of the first caliper support bracket 30. The piston 40 is then actuated which in turn results in braking of the second disk 20 by the second caliper assembly 52.

Looking specifically to FIG. 2, a line 62 is illustrated extending through the plane of the first disk 18. This line 62 naturally extends through the center of force between the first disk 18 and first caliper assembly 28 during braking. This center of force is located approximately at point A. In spite of the added complexity in design of the first caliper support bracket 30, it can be seen in FIG. 2 that the first caliper support bracket 30 is positioned on the support shaft 14 such that point B on the plane of the first disk 18 is located within the hub 64 of the first caliper support bracket 30. To this end, the first disk 18 is recessed at its attachment to the hub 16 to avoid the hub 64 of the bracket 30. The extension 58 of the first caliper support bracket 30 extends at an angle to the body of the first caliper support bracket 30 to engage the eye 56 of the piston 40 also in the plane of the first disk 18 at point C. Through location of the coupling between the first caliper support bracket 30 and the piston 40 of the hydraulic cylinder 36 along the plane of the first disk 18, torque loading on the system other than about the axis of the support shaft 14 is substantially eliminated.

Figure 3:
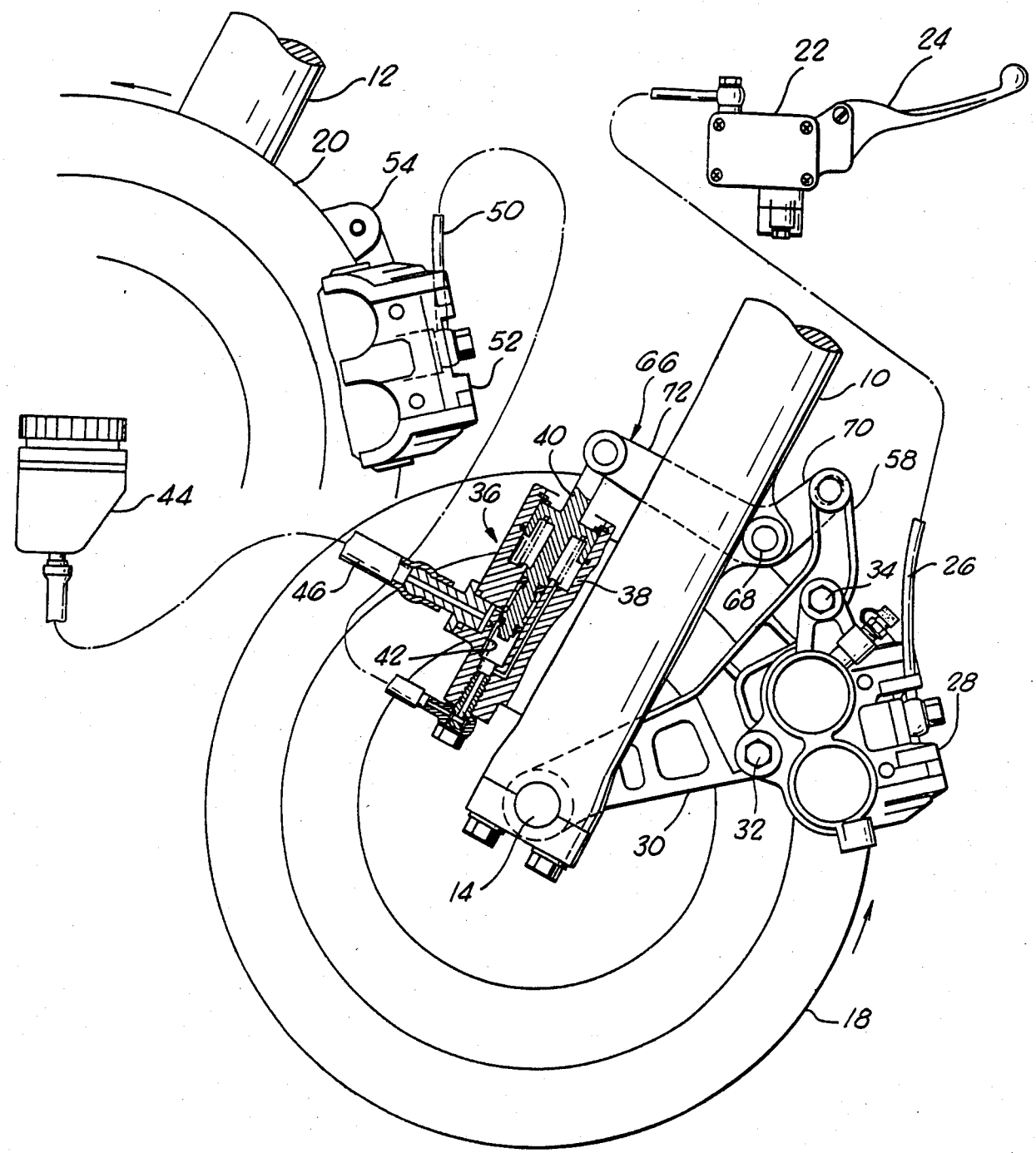
FIG. 3 is a side elevation of a second embodiment of the present invention.

Looking then to the embodiment of FIG. 3, similar reference numbers are employed to designate identical or equivalent elements. The embodiment of FIG. 3 differs from that of FIG. 2 in that the coupling between the extension 58 of the first caliper support bracket 30 and the piston 40 of the hydraulic cylinder 36 is by means of a bell crank generally designated 66. The bell crank 66 is pivotally mounted about a pin 68 and includes a first arm 70 extending to the extension 58 of the caliper support bracket 30. A second arm 72 extends to the piston 40. The relative lengths of the arms 70 and 72 define the mechanical advantage controlling the resulting force on the piston 40. Additionally, the relative displacement between the caliper support bracket 30 and the piston 40 is dependent upon the relative lengths of the arms 70 and 72 of the bell crank 66. It can be noted by a comparison of FIGS. 1 and 3 that the bell crank also serves to relocate the hydraulic cylinder 36. In this way, a more convenient orientation of the hydraulic cylinder 36 may be realized.

Thus, an improved disk brake system employing two disk and caliper arrangements mechanically associated in series is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A series type brake system for a vehicle including a first disk rotatably mounted about a first axis relative to the vehicle, said first disk lying in a plane perpendicular to said first axis, a first caliper support bracket pivotally mounted about said first axis, a first caliper mounted on said first caliper support bracket and extending over said first disk, and a hydraulic cylinder fixed to said vehicle, a second caliper, and a second disk, said second caliper extending over said second disk and being operatively coupled with said hydraulic cylinder wherein the improvement comprises said first caliper support bracket including a hub mounted about said axis and a first extension coupled with said hydraulic cylinder, said hub and said first extension being located in said plane of said disk, said hub, extension and disk being in said plane to avoid braking loads generating torque between components about axes perpendicular to said first axis.

2. The series type brake system of claim 1 wherein said hydraulic cylinder includes a cylinder and a piston slidably extending within said cylinder, said piston being coupled with said first caliper support bracket at said first extension.

3. The series type brake system of claim 1 further including a pin wherein said pin directly connects said hydraulic cylinder to said first caliper support bracket.

4. A series type brake system for a vehicle including a first disk rotatably mounted about a first axis relative to the vehicle, said first disk lying in a plane perpendicular to said first axis, a first caliper support bracket pivotally mounted about said first axis, a first caliper mounted on said first caliper support bracket and extending over said first disk and a hydraulic cylinder fixed to said vehicle wherein the improvement comprises said first caliper support bracket including a hub mounted about said axis and a first extension coupled with said hydraulic cylinder, said hub and said first extension being located in said plane of said disk, a second disk rotatably mounted about said first axis relative to the vehicle, a second caliper support bracket fixed relative to the vehicle, a second caliper mounted on said second caliper support bracket said hydraulic cylinder being in communication with said second caliper.

5. A series type brake system for a vehicle including a first disk rotatably mounted about a first axis relative to the vehicle, said first disk lying in a plane perpendicular to said first axis, a first caliper support bracket pivotally mounted about said first axis, a first caliper mounted on said first caliper support bracket and extending over said first disk and a hydraulic cylinder fixed to said vehicle wherein the improvement comprises said first caliper support bracket including a hub mounted about said axis and a first extension coupled with said hydraulic cylinder, said hub and said first extension being located in said plane of said disk, a bell crank pivotally mounted relative to the vehicle, said bell crank connecting at a first end to said hydraulic cylinder and connecting at a second end to said first caliper support bracket, said hydraulic cylinder and said first caliper support bracket being coupled through said bell crank.

* * * * *